United States Patent [19]

Sasada et al.

[11] Patent Number: 5,894,380
[45] Date of Patent: Apr. 13, 1999

[54] RECORDING/REPRODUCING SEPARATION TYPE MAGNETIC HEAD

[75] Inventors: Yukio Sasada; Tadashi Imanaka, both of Odawara; Hiroaki Koyanagi, Hadano, all of Japan; Fumiomi Ueda, Tuscaloosa, Ala.

[73] Assignee: Hitachi, Ltd., Tokyo, Japan

[21] Appl. No.: 08/760,868

[22] Filed: Dec. 9, 1996

[30] Foreign Application Priority Data

Dec. 15, 1995  [JP]  Japan .................................. 7-327497

[51] Int. Cl.⁶ .................................................. G11B 5/60
[52] U.S. Cl. .................................................. 360/103
[58] Field of Search .................................... 360/103, 123, 360/113

[56] References Cited

U.S. PATENT DOCUMENTS 5,001,591   3/1991   Nakashima ............................ 360/103

FOREIGN PATENT DOCUMENTS 6-103530   4/1994   Japan .

Primary Examiner—Robert S. Tupper
Attorney, Agent, or Firm—Antonelli, Terry, Stout & Kraus, LLP

[57] ABSTRACT

A slider including a recording and reproducing separation type magnetic head includes that a proximal end of a first lead-out conductor is connected to a proximal end of a central winding portion of a coil sued for record, a distal end of the first lead-out conductor is connected to one terminal used for the record; a proximal end of second lead-out conductor is connected to a proximal end of the winding coil, and extended to an opposite direction against the first lead-out conductor along the upper surface of the slider, a distal end of the second lead-out conductor is connected to another terminal used for the recording device; a proximal end of a third lead-out conductor is connected to a reproducing device; a proximal end of a fourth lead-out conductor is connected to the reproducing device; the third lead-out conductor is extended along an air bearing surface of the slider in a lateral direction; the fourth lead-out conductor is extended along the air bearing surface of the slider in a direction opposite to the lateral direction; and the respective distal ends of the third and fourth lead-out conductors are connected to one and another terminals for the reproduction, making such an integrated circuit and the like connected to the terminals to be readily standardized and making an electrode for a reproducing device short.

6 Claims, 5 Drawing Sheets

RECORDING/REPRODUCING SEPARATION TYPE MAGNETIC HEAD

BACKGROUND OF THE INVENTION

The present invention relates to the positions of terminals of a recording/reproducing separation type magnetic head which copes with a high recording density, and the shape and structure of its lead-out conductors.

In connection with the pads of a magnetic head, there has been JP-A-6-103530 disclosing a layout method of bonding pads capable of freely setting lead-out directions of wires. This method contemplates to accomplish a smaller thickness and a smaller size by obliquely disposing the bonding pads to an air bearing surface.

SUMMARY OF THE INVENTION

It is an object of the present invention to provide a recording and reproducing separation type magnetic head capable of reducing an electrode resistance to be connected to a reproducing device and selecting a winding direction of a recording coil irrelevantly to a direction of a current flowing through terminals for a recording device.

The first aspect of an embodiment of the present invention for accomplishing the object described above is that a slider including a recording and reproducing separation type magnetic head having a magnetic induction type device for record and a magnetoresistance effect type device for reproduction connected through lead-out conductors to terminals includes that a proximal end of a first lead-out conductor is connected to a proximal end of a central winding portion of a coil used for record, extended to an upper surface opposite to an air bearing surface of the slider from the central winding portion, and extended to a lateral direction along the upper surface of the slider, a distal end of the first lead-out conductor is connected to one terminal used for the record; and a proximal end of a second lead-out conductor is connected to a distal end of the winding coil, and extended to an opposite direction against the first lead-out conductor along the upper surface of the slider, a distal end of the second lead-out conductor is connected to another terminal used for the record.

A position of the distal end of the first lead-out conductor connected to the distal end of the coil used for the recording device may be located on a position where a length of the coil is the same length in winding both clockwise and counter-clockwise from the distal end to the proximal end of the central winding portion of the coil.

The coil used for the recording device and the first and second lead-out conductors may be constructed that the coil is wound in one direction; the first and second lead-out conductors are formed substantially in parallel; a substantially middle portion of the first lead-out conductor is connected with the proximal end of the central winding portion of the coil; a substantially middle portion of the second lead-out conductor is connected with the distal end of the coil; respective both distal ends of the first and second lead-out conductors are connected to one and another terminals used for the record; a portion at the first lead-out conductor extended to one direction from a connected portion where the first lead-out conductor and the proximal end of the coil are connected is cut apart; and a portion at the second lead-out conductor extended to another direction opposite to the one direction from a connected portion where the second lead-out conductor and the distal end of the coil are connected is cut apart.

The second aspect of an embodiment of the present invention is that a slider including a recording and reproducing separation type magnetic head having a magnetic induction type device for record and a magneto-resistance effect type device for reproduction connected through lead-out conductors to terminals includes that a proximal end of a first lead-out conductor is connected to a proximal end of a central winding portion of a coil used for record, extended to an upper surface opposite to an air bearing surface of the slider from the central winding portion, and extended to a lateral direction along the upper surface of the slider, a distal end of the first lead-out conductor is connected to one terminal used for the record; a proximal end of a second lead-out conductor is connected to a distal end of the winding coil, and extended to an opposite direction against the first lead-out conductor along the upper surface of the slider, a distal end of the second lead-out conductor is connected to another terminal used for the recording device; a proximal end of a third lead-out conductor is connected to a reproducing device; a proximal end of a fourth lead-out conductor is connected to the reproducing device; the third lead-out conductor is extended along an air bearing surface of the slider in a lateral direction; the fourth lead-out conductor is extended along the air bearing surface of the slider in a direction opposite to the lateral direction; and the respective distal ends of the third and fourth lead-out conductors are connected to one and another terminals for the reproduction.

The respective proximal ends of the third and fourth lead-out conductors may be connected to the reproducing device and extended along close to an air bearing surface of the slider in a laterally opposite direction each other, the respective distal ends of the third and fourth lead-out conductors are connected to one and another terminals for the reproduction present within the terminals for the record close to the coil.

The construction of the present invention described above can reduce the length of the lead-out conductors to be connected to the reproducing device, and can therefore reduce the electric resistance. The length of the coil is the same whether the winding direction of the coil may be clockwise or counter-clockwise. Therefore, even when the coil is wound either clockwise or counter-clockwise, the number of photomasks used for the production process of the terminals and the lead-out conductors can be reduced minimum, and standardization of integrated circuits connected to the terminals becomes easier. Furthermore, the arrangement of such circuits can be made uniform. Even when the winding direction of the coil is unidirectional, the air bearing direction of the current flowing through the coil can be set either clockwise or counter-clockwise.

3

Figure 7A:
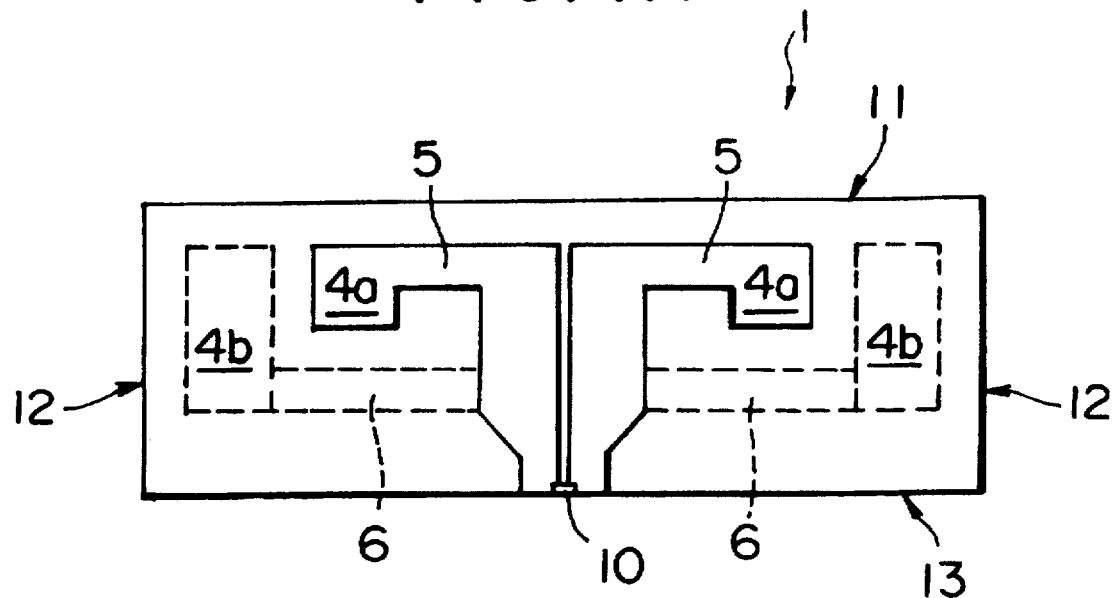

FIG. 7A is a front view showing a slider according to the related art; and

Figure 7B:
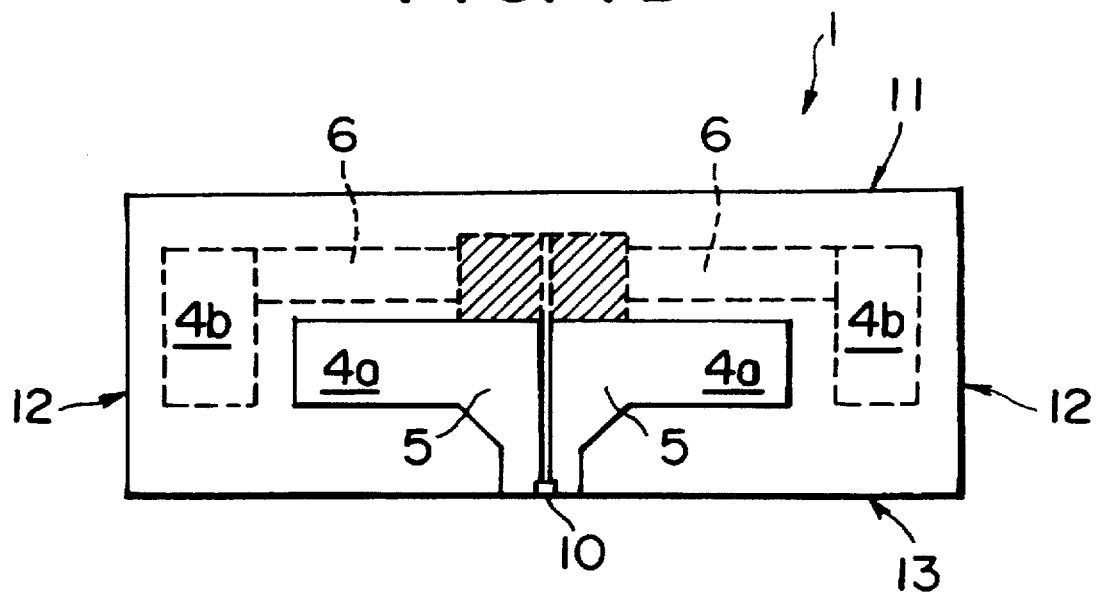

FIG. 7B is a front view showing an example of the slider according to the present invention.

DESCRIPTION OF THE PREFERRED EMBODIMENTS

Hereinafter, preferred embodiments of the present invention will be described.

Figure 1:
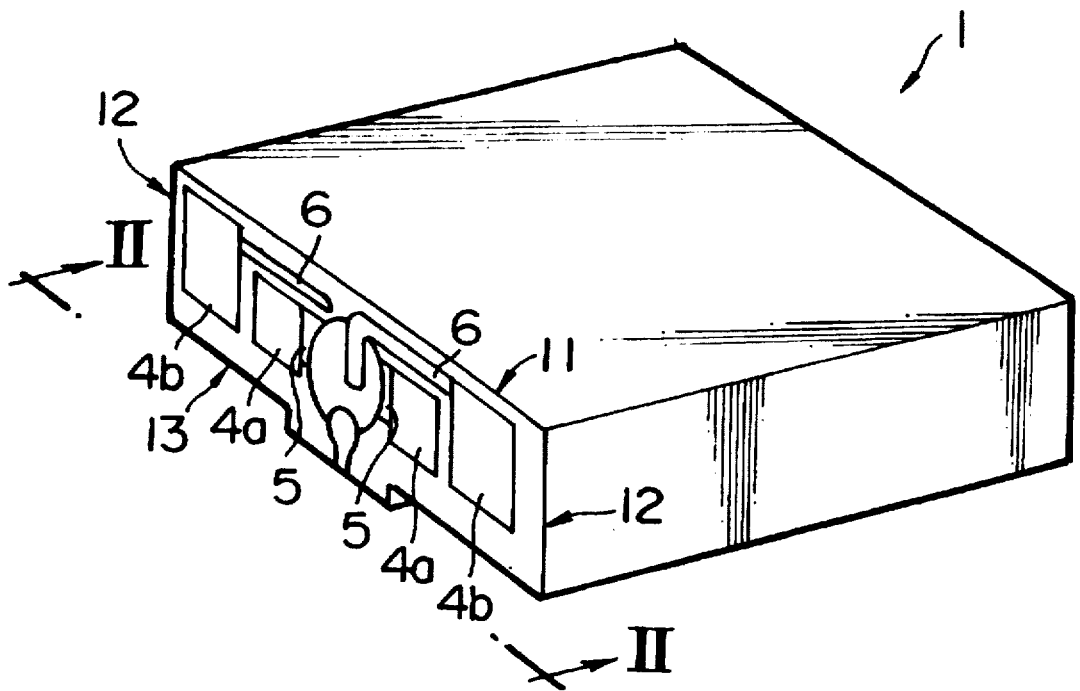
FIG. 1 is a perspective view showing an example of a slider having a recording reproducing separation type magnetic head according to the present invention.
Figure 2:
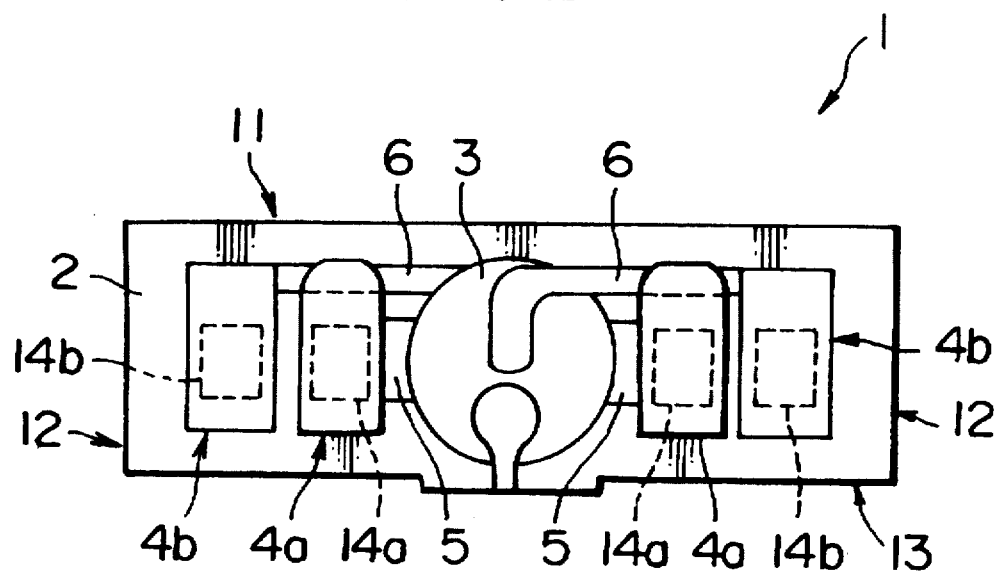
FIG. 2 is a front view represented by arrows II—II in FIG. 1.

FIG. 1 is a perspective view showing a recording/reproducing separation type magnetic head according to an embodiment of the present invention, and FIG. 2 is a front view of a slider front surface of the recording/reproducing separation type magnetic head represented by arrows II—II in FIG. 1. In the drawings, reference numeral 1 denotes a recording/reproducing separation type magnetic head (hereinafter referred to as the "slider"), reference numeral 2 denotes a trailing surface, reference numeral 3 denotes a magnetic transducer, reference numeral 4a denotes a terminal for a reproducing device, reference numeral 4b denotes a terminal for a recording device, reference numeral 5 denotes a lead-out conductor for connecting the reproducing device to the terminal 4a for the reproducing device, reference numeral 6 denotes a lead-out conductor for connecting the recording device to the terminal 4b for the recording device, reference numeral 11 denotes a slider upper surface, reference numeral 12 denotes slider side surfaces, reference numeral 13 denotes a slider air bearing surface, reference numeral 14a denotes a terminal connection portion for the reproducing device, and reference numeral 14b denotes a terminal connection 5 portion for the recording device.

In the slider 1 shown in FIG. 1, two terminals, that is, the terminal 4a for the reproducing device and the terminal 4b for the recording device, are disposed on each side of the magnetic transducer 3 comprising the recording device and the reproducing device on the front surface 2 on the air outflow side of the slider 1. This embodiment uses the magnetic induction type transducer 3 as a recording device and a magneto-resistance effect type transducer 10 (hereinafter, referring to an MR transducer; FIG. 7B) as a reproducing device.

The construction shown in FIG. 2 will be explained. The MR transducer 10 (FIG. 7B) and the terminal 4a are connected to each other by the lead-out conductor 5 and the magnetic transducer 3 and the terminal 4b are connected by the lead-out conductor 6. The lead-out conductor 6 is once extended directly above from the center of the magnetic transducer 3 (towards the slider upper surface 11 on the opposite side to the slider air bearing surface 13) and then to the right or the left. Since the lead-out conductor 6 for connecting the magnetic transducer 3 and the terminal 4b extends on the slider upper surface side over the terminal connection portion 14a between the terminal 4a for the MR transducer 10 (FIG. 7B) and the lead-out conductor 5 in this way, it becomes possible to position the terminal 4a for the MR transducer 10 (FIG. 7B) in the proximity of the magnetic transducer 3 and in the proximity of the slider air bearing surface 13.

FIGS. 7A and 7B comparatively show the pattern of the magneto-resistance effect type transducer 10, the terminals 4a and 4b and the lead-out conductors 5 and 6 of the magnetic transducer and the MR transducer 10 of the related art and that of the present invention. In the front surface 2 shown in each of FIGS. 7A and 7B, pattern of lead-out conductors for the MR transducer 10 is represented by a solid line, and a dotted-line portion represents the positions

4 of the terminal 4b for the magnetic transducer and the lead-out conductor 6 that are formed by a post-treatment. As can be seen from the pattern for the MR transducer 10 of the present invention shown in FIG. 7B, the electrode resistance of the MR transducer 10 can be lowered by the decrement of the length of the lead-out conductor 5 with respect to the terminal 4a, that is, by the degree corresponding to the oblique line portion.

Figure 3:
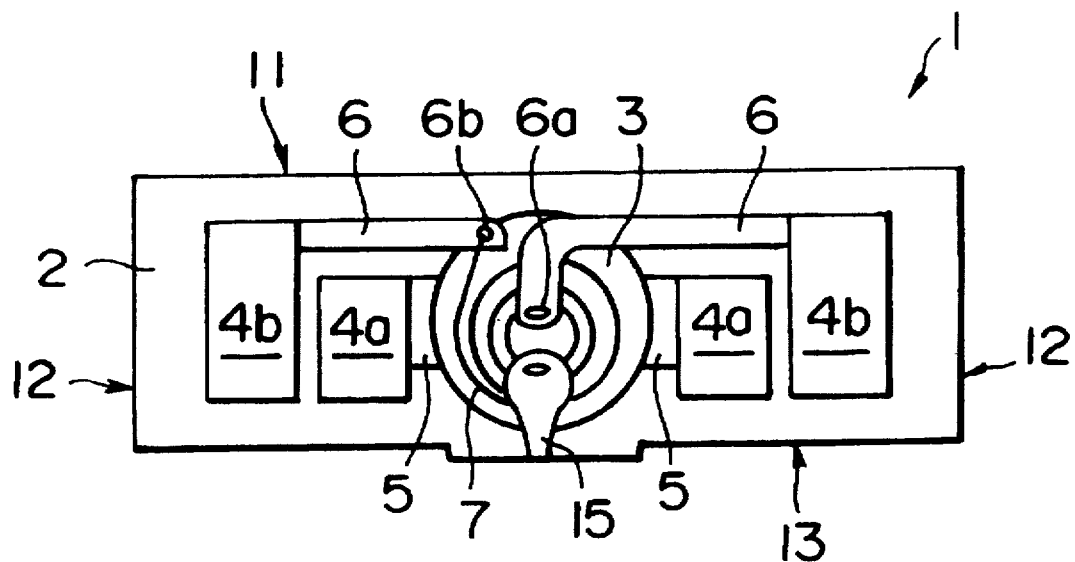
FIG. 3 is a front view when a coil is wound counter-clockwise in the slider.
Figure 4:
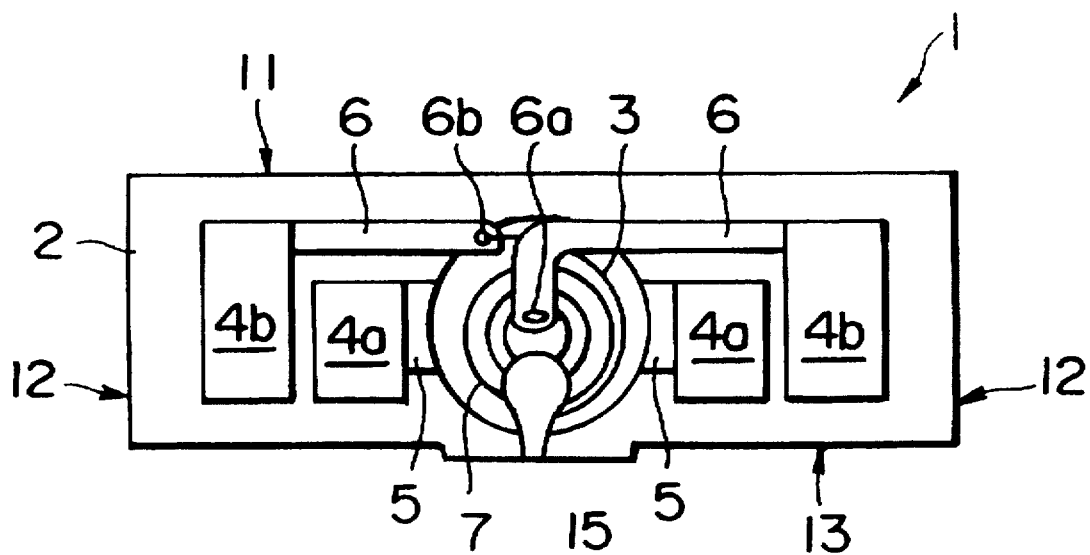
FIG. 4 is a front view when the coil is wound clockwise in the slider.

FIG. 3 is a front view of the slider 1 to which a magnetic transducer 3 having a coil 7, which is wound clockwise, is mounted, according to the present invention, and FIG. 4 is a front view of the slider 1 to which the magnetic transducer 3 having a coil 7, which is wound counter-clockwise, is mounted according to the present invention. In this slider 1, the coil 7 is formed through an insulating film such as alumina on the MR transducer 10 (FIG. 7B) inside the magnetic transducer 3 which is disposed in the manner described above, and an upper magnetic layer 15 such as permalloy is formed through an insulating film such as a photoresist, thereby forming the magnetic transducer 3.

As shown in FIGS. 3 and 4, one of the lead-out conductors 6 (the conductor on the right side) is extended directly above from the connection portion 6a between the coil 7 and the lead-out conductor 6 (towards the slider upper surface 11), passes over the terminal connection side of the MR transducer 10 (FIG. 7B) on the slider upper surface side and is then connected to the terminal 4b of the magnetic transducer 3. The other lead-out conductor (the conductor on the left side) is extended from the connection portion 6a between the coil 7 and the lead-out conductor 6 in the proximity of the slider upper surface of the magnetic transducer 3, passes over the terminal connection portion of the MR transducer 10 (FIG. 7B) on the slider upper surface side and is connected to one of the terminals 4b (the terminal on the left side) of the magnetic transducer 3.

As described above, even when the coil 7 is wound either clockwise or counter-clockwise, the coil 7 has the same length. Therefore, no difference occurs in the electrical characteristics of the slider 1, and the lead-out conductors 6 for connecting the magnetic transducer 3 to the terminal 4b can be used in common. In consequence, the number of photomasks used in the production process may be only one with the exception of the cases where the coil 7 is wound clockwise and counter-clockwise.

Figure 5A:
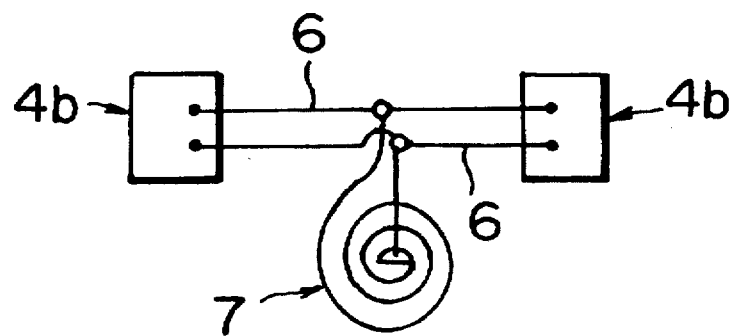
FIGS. 5A to 5C are explanatory views each showing an example where a current flows through a coil of a recording device and a lead-out conductor in a clockwise or counter-clockwise direction.
Figure 5B:
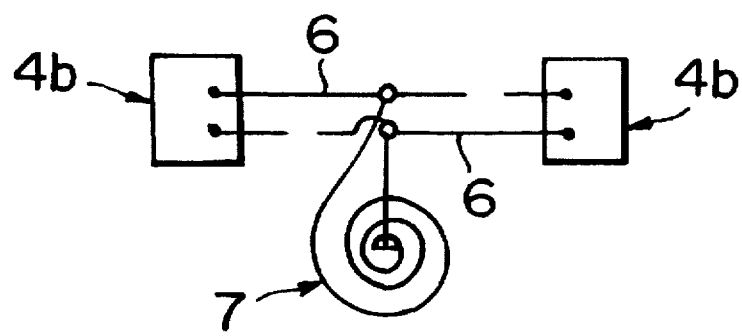
Figure 5C:
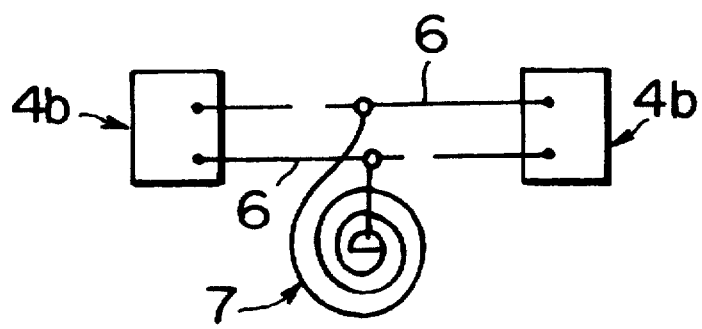

FIGS. 5A, 5B and 5C show the production process of the magnetic induction type structure except for the magneto-resistance effect type structure in relation to FIGS. 3 and 4. In FIG. 5A, two lead-out conductors 6 are formed so as to extend between two terminals 4b and 4b at both ends of the coil 7 wound in one direction. In FIG. 5B, a portion of one of the lead-out conductors 6 extending to the right direction from a junction where the lead-out conductor 6 is connected with the distal end of the coil 7 is cut apart by Ar ion milling process, and a portion of the other of the lead-out conductor 6 extending to the left direction from a junction where the lead-out conductor 6 is connected with the proximal end of the coil 7 is cut apart by the same process. In this way, assuming that the direction of flowing current to one of the terminals 4b at one end is incorrect, two lead-out conductors 6 can be cut apart as described above, making a current direction constant. As a result, integrated circuits and other components connected to the terminals 4b are not required to replace with other new components when the connection is incorrect, avoiding cost increase. In FIG. 5C, a portion of one of the lead-out conductors 6 extending to the left direction from a junction where the lead-out conductor 6 is connected with the distal end of the coil 7 is cut apart by the process, and a portion of the other of the lead-out conductor 6 extending to the right direction from a junction where the lead-out conductor 6 is connected with the proximal end of the coil 7 is cut apart by the process. In this way, even though the direction of flowing current to one of the terminals 4b at one end is correct, the direction of flowing current to the coil 7 can be changed, making the design for slider 1 easy. In addition, the lead-out conductors 6 can be cut apart by FIB (Focused Ion Beam) as well. In this way, the current can be allowed to flow both clockwise and counter-clockwise without changing the winding direction of the coil 7, making specification of the components and their locations standardized.

The coil 7 of the magnetic transducer shown in the drawings is composed of single layer, but it can be composed naturally of two layers.

Figure 6:
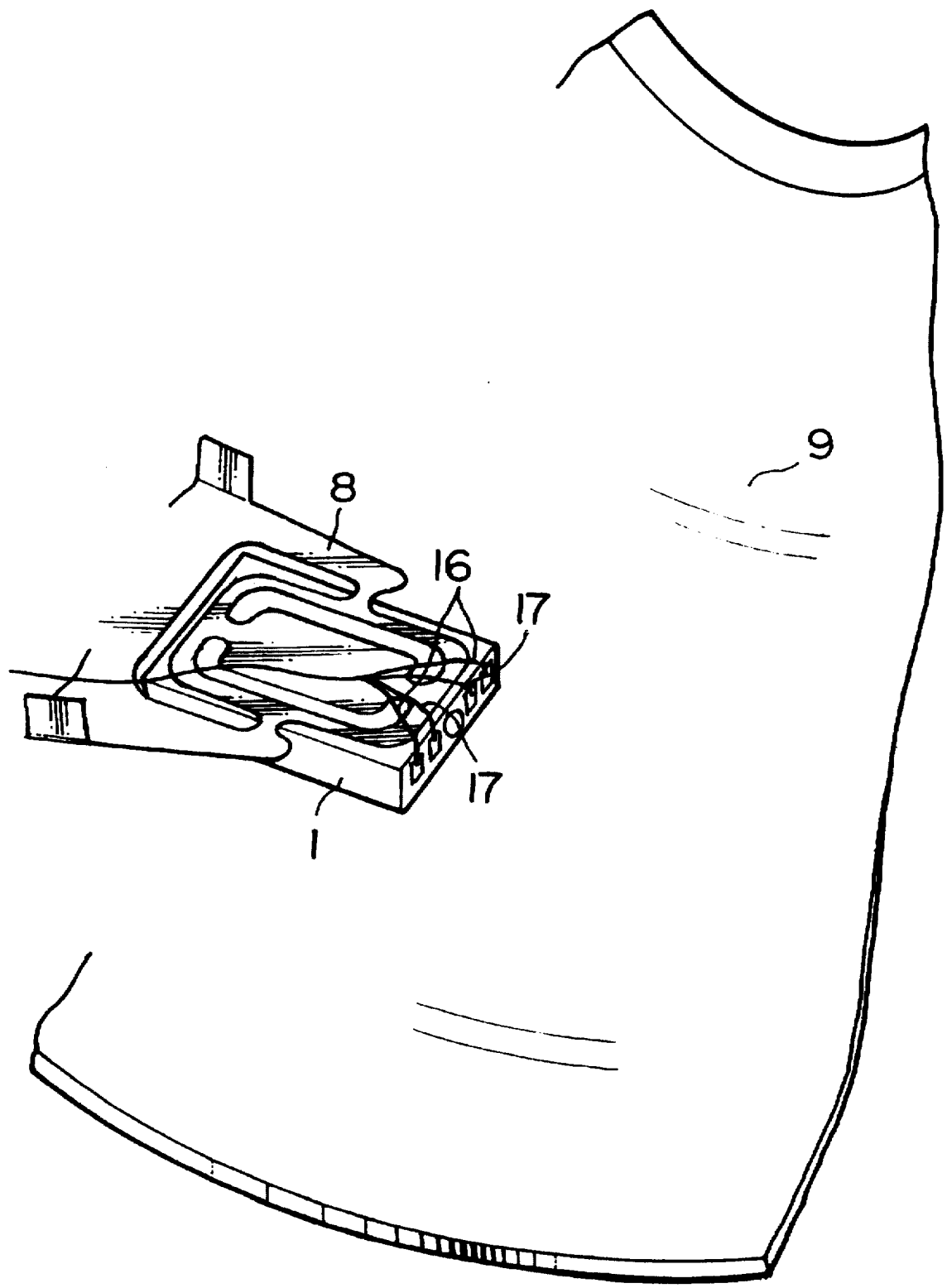
FIG. 6 is a perspective view showing an example of the use of the recording/reproducing separation type magnetic head according to the present invention.

FIG. 6 is a perspective view of the embodiment wherein the recording/reproducing separation type magnetic head, that is, the slider 1, is mounted on a medium. According to this construction, the head having excellent electrical characteristics can be packaged, and a high reliability apparatus can be obtained economically.

Incidentally, the lead-out conductors 5 connected to the terminals 4a and 4a for the MR transducer 10 in FIGS. 1 to 4 and 7B are shown disposed substantially on the horizontal center line of the slider 1 because the terminals 4b and 4b for the magnetic transducer 3 and the terminals 4a and 4b for the MR transducer 10 are formed at the same horizontal position, but the terminals 4b and 4b and the terminals 4a and 4a are preferably formed on the side of the slider air bearing surface 13 as close as possible in order to reduce as much as possible the resistance of the lead-out conductors 5. Particularly because the lead-out conductors 5 are preferably as close as possible to the magneto-resistance effect type sensor or MR transducer 10, they are preferably so formed as to extend along the air bearing surface 13 as close as possible thereto.

What is claimed is:

1. A slider including a recording and reproducing magnetic head formed on a surface of said slider and connected to a magnetic induction type device and a mnagneto-resistance effect type device for recording and reproducing information to and from a recording medium through lead-out conductors to terminals, comprising:

a first lead-out conductor connected to a central end of a coil wound in a whirling-like manner as a recording device, a first conductor portion of said first lead-out conductor extending from the central end of said coil in a direction substantially perpendicular to a medium-opposing surface and extending toward an upper surface side of said slider, and a second conductor portion of said first lead-out conductor extending from said first conductor portion and substantially parallel to the upper surface side in one lateral direction and is connected to a first recording device terminal provided at a first lateral side of said slider;

a second lead-out conductor connected to another end of said coil located at an outer portion of said coil, and extending substantially parallel to the upper surface side of said slider in the other lateral direction and is connected to a second recording device terminal provided at a second lateral side of said slider;

a third lead-out conductor connected to one end of a reproducing device located with respect to said medium opposing surface of said slider, and having a first conductor portion extending toward the upper surface side of said slider in a direction substantially perpendicular to said medium opposing surface, and a second conductor portion extending from said first conductor portion substantially parallel the upper surface side in the one lateral direction but closer to said medium opposing surface than eider of said first and second lead-out conductors, and is connected to a third reproducing device terminal which is closer to a center of said slider than either of said first and second recording device terminals; and a fourth lead-out conductor connected to the other end of said reproducing device, and having a first conductor portion extending toward the upper surface side of said slider in the substantially perpendicular to said medium opposing surface, and a second conductor portion extending from said first conductor portion substantially parallel to the upper surface side in the other lateral direction but closer to said medium opposing surface than either of said first and second lead-out conductors, and is connected to a fourth reproducing device terminal which is closer to the center of said slider than either of said first and second recording device terminals.

2. A slider according to claim 1, wherein said first lead-out conductor and said second lead-out conductor are arranged such that a length of said coil is the same whether a clockwise wound coil or a counter-clockwise coil is used with said first lead-out conductor and said second lead-but conductor.

3. A slider according to claim 1, wherein said coil and said first and second lead-out conductors are constructed such that: said coil is wound in one direction; said first and second lead-out conductors are formed substantially in parallel; a substantially middle portion of said first lead-out conductor is connected with a proximal end of a central winding portion of said coil; a substantially middle portion of said second lead-out conductor is connected with a distal end of said coil; respective both digital ends of said first and second lead-out conductors are connected to said first recording device terminal and said second recording device terminal used for the recording head; a portion of said first lead-out conductor extended to said other lateral direction from a connected portion where said first lead-out conductor and said proximal end of said coil are connected is cut apart; and a portion of said second lead-out conductor extended to said lateral direction opposite to said other lateral direction from a connected portion where said second lead-out conductor and said distal end of said coil are connected is cut apart.

4. A slider according to claim 1, wherein said coils and said first and second lead-out conductors are constructed such that: said first and second lead-out conductors are formed substantially in parallel; a substantially middle portion of said first lead-out conductor is connected with a proximal end of a central winding portion of said coils; a substantially middle portion of said second lead-out conductor is connected with a distal end of said coils; respective both distal ends of said first and second lead-out conductors are connected to said first recording device terminal and said second recording device terminal used for said recording head; a portion of said first lead-out conductor extended to said other lateral direction from a connected portion where said first lead-out conductor and said proximal end of said coils are connected is cut apart; and a portion of said second lead-out conductor extended to said lateral direction opposite to said other lateral direction from a connected portion where said second lead-out conductor and said distal end of said coils are connected is cut apart.

5. A slider including a recording and reproducing magnetic head formed on a surface of said slider and connected to a magnetic induction type device and a magnetoresistance effect type device for recording and reproducing information to and from a recording medium through lead-out conductors to terminals, comprising:

- a first lead-out conductor connected to central ends of both a first-layered coil and a second-layered coil which are wound in a whirling-like manner as a recording device,
- a first conductor portion of said first lead-out conductor extending from said central ends of said coils in a direction substantially perpendicular to a medium-opposing surface and extending toward an upper surface side of said slider, and a second conductor portion of said first lead-out conductor extending from said first conductor portion and substantially parallel to said upper surface side of said slider in one lateral direction and is connected to a first recording device terminal provided at a first lateral side of said slider;
- a second lead-out conductor connected to outer peripheral ends of both said first-layered coil and said second-layered coil, and extending substantially parallel to said upper surface side of said slider in other lateral direction and is connected to a second recording device terminal provided at a second lateral side of said slider;
- a third lead-out conductor connected to one of a reproducing device located with respect to said medium opposing surface of said slider, and having a first conductor portion extending toward the upper surface side of a slider in a direction substantially perpendicular to said medium opposing surface, and a second conductor portion extending from said first conductor portion substantially parallel to the upper surface side in the one lateral direction but closer to said medium opposing surface than either of said first and second lead-out conductors, and is connected to a third reproducing device terminal which is closer to a center of said slider than either of said first and second recording device terminals; and
- a fourth lead-out conductor connected to other end of said reproducing device, and having a first conductor portion extending toward the upper surface side of said slider in the direction substantially perpendicular to said medium opposing surface and a second conductor portion extending from said first conductor portion substantially to the upper surface side in the other lateral direction but closer to said medium opposing surface than either of said first and second lead-out conductors, and is connected to a fourth reproducing device terminal which is closer to the center of said slider than either of said first and second recording device terminals.

6. A slider according to claim 5, wherein said first lead-out conductor and said second lead-out conductor are arranged such that lengths of said coils are the same whether a clockwise wound coil or a counter-clockwise colt is used with said first lead-out conductor and said second lead-out conductor.

* * * * *